US007308277B2

(12) United States Patent
Yomoda

(10) Patent No.: US 7,308,277 B2
(45) Date of Patent: Dec. 11, 2007

(54) HANDHELD TERMINAL DEVICE AND DISPLAY CONTROL METHOD THEREFOR

(75) Inventor: Miyuki Yomoda, Saitama (JP)

(73) Assignee: NEC Corporation, Tokyo (JP)

( * ) Notice: Subject to any disclaimer, the term of this patent is extended or adjusted under 35 U.S.C. 154(b) by 209 days.

(21) Appl. No.: 10/893,934

(22) Filed: Jul. 20, 2004

(65) Prior Publication Data

US 2005/0020318 A1  Jan. 27, 2005

(30) Foreign Application Priority Data

Jul. 23, 2003  (JP)  ............................. 2003-278173

(51) Int. Cl.
H04Q 7/20 (2006.01)
H04M 3/42 (2006.01)
(52) U.S. Cl. ...................... 455/466; 455/415
(58) Field of Classification Search ................ 455/415, 455/414.1, 466, 550.1, 566, 567; 379/142.04, 379/142.06, 142.09
See application file for complete search history.

(56) References Cited

U.S. PATENT DOCUMENTS 6,766,018 B1   7/2004 Morita 6,813,344 B1 * 11/2004 Lemke ................... 379/142.06
2002/0094806 A1 * 7/2002 Kamimura ................... 455/415
2002/0180863 A1  12/2002 Fukuda
2003/0064708 A1   4/2003 Oota et al.
2004/0137955 A1 * 7/2004 Engstrom et al. ........... 455/566

FOREIGN PATENT DOCUMENTS

| JP | 10-327232 A | 12/1998 |
|----|----|----|
| JP | 2000-295667 A | 10/2000 |
| JP | 2000-332878 | 11/2000 |
| JP | 2000-358086 A | 12/2000 |
| JP | 2001-103133 | 4/2001 |
| JP | 2001-273236 A | 10/2001 |
| JP | 2001-296828 | 10/2001 |
| JP | 2002-112139 A | 4/2002 |
| JP | 2002-158981 A | 5/2002 |
| JP | 2002-176679 A | 6/2002 |
| JP | 2003-110659 | 4/2003 |

* cited by examiner

Primary Examiner—Duc M. Nguyen
Assistant Examiner—Michael Thier
(74) Attorney, Agent, or Firm—Foley & Lardner LLP

(57) ABSTRACT

A cell phone provided with a chat dedicated message display screen, in addition to a screen for transmission and receipt of normal email messages, in order to realize the chat function, searches for an email address registered in the telephone directory in the chat dedicated message display screen and, when the search finds a digital camera registered in association with that email address, displays such digital camera image on the chat dedicated message display screen.

22 Claims, 3 Drawing Sheets

HANDHELD TERMINAL DEVICE AND DISPLAY CONTROL METHOD THEREFOR

BACKGROUNDS OF THE INVENTION

1. Field of the Invention

The present invention relates to a handheld terminal device and a display control method therefor.

2. Description of the Related Art

Handheld terminal devices, such as cell phones and PDAs, have conventionally been provided with a display to show the content of communication. A number of arts have been proposed to make such display easier to see. For example, in order to display a short message sent to a cell phone on a larger screen for easier viewing, one of these arts proposes a television which includes a television function part, a cell phone function part, and a control part. In this television, when a short message arrives at the television function part, the control part sounds a ringtone, flashes the LED, and then shows the message on the TV screen in scrolling display (refer to Japanese Patent Laying-Open (Kokai) No. 2002-112139).

Another example of these arts proposes a communication terminal which has a camera part, consisting of a digital camera, and a cell phone part. This communication terminal stores images shot using the digital camera in a memory, for later view as necessary, on a display under the control of the cell phone part (refer to Japanese Patent Laying-Open (Kokai) No. 2000-295667).

Yet another example of these arts proposes a data processing unit wherein a first storing part stores pieces of image data that have been input by an image inputting part; an identification information assigning part assigns identification information for linkage between each piece of image data and a telephone number input by a telephone number inputting part; a second storing part stores a list of links among identification information, telephone number, and image data; and a screen display controlling part displays said image data, from which the user can select an image to make a phone call to the telephone number that is stored in the second storing part with a link to the selected image (refer to Japanese Patent Laying-Open (Kokai) No. 2001-273236).

Many other related arts have also been proposed. One example of these arts proposes a method which can eliminate the necessity for the user to associate a piece of image information with a telephone number and register them in a telephone directory, by automating the association between image information and text information and the registration of this association in the telephone directory (refer to Japanese Patent Laying-Open (Kokai) No. 2002-158981).

Another example of these arts proposes a handheld telephone which can display the portrait images of callers and other image data. This handheld telephone registers the telephone numbers of specific individuals as registered numbers, stores in a flash memory the still image data of these individuals shot using a digital camera, and stores in a RAM a table of registered numbers which contains associations between image data and registered number. When a call arrives, the telephone looks up the table of registered numbers to find if the telephone number matches with any of the registered numbers. If there is a match, the telephone then reads and outputs the image data associated with the matching registered number to the display (refer to Japanese Patent Laying-Open (Kokai) No. Heisei 10-327232).

Yet another example of these arts proposes a cell phone which allows the user to identify the caller by the color to which the display changes on the arrival of a call. In this cell phone, which is capable of changing the display screen into several colors, the user first registers in a telephone directory list other party IDs and their associated display colors. On the arrival of a call, the cell phone collates the caller ID detected with the other party IDs registered in the telephone directory and, if there is a match, it changes the display to the color associated with the matching other party ID (refer to Japanese Patent Laying-Open (Kokai) No. 2000-358086).

Yet another example of these arts proposes a highly convenient mobile radio terminal which allows the user to identify the caller easily on receiving a call or an email message. This mobile radio terminal stores, in a telephone directory data storing area, telephone directory data consisting of the names of possible other-end parties and their associated telephone numbers and email addresses. It also stores associations among identification information for different elements, including image data to be used for alert operation on receiving a call or an email message, ringtone and call signaling melody, background color, and vibration pattern to be generated by a vibrator. The mobile radio terminal stores image data associated with various kinds of identification information in the image data storing area, and data of multiple ringtones and call signaling melodies in the data ringtone storing area, respectively. When a call or an email message arrives, the control part of the terminal alerts the user by displaying multiple images as applicable according to the telephone directory data stored in the telephone data storing area (refer to Japanese Patent Laying-Open (Kokai) No. 2002-176679).

In conventional cell phones in which the chat function utilizing the email function is implemented, the user creates a list of individuals with whom the user may chat and registers in the list the images to be displayed on the chat dedicated screen. This means that, images shot using a digital camera and stored in the telephone directory, if any, cannot be used for chat; the user needs to register the existing images all over again as chat-dedicated images. None of the above-described arts recognize the technical issue of addressing the problematic inconvenience that images dedicated to communications in a specific conversation form like chat must be registered all over again even though these images already exist in the terminal for other purposes. As a result, these conventional arts do not make any suggestion as to in what way such technical issue may be solved.

SUMMARY OF THE INVENTION

An object of the present invention is to provide a handheld terminal device and a display control method therefor which allow a digital camera image to be used for display on a message display screen dedicated to a specific conversation form like chat if such image has been registered in association with an other-end party registered in a telephone directory.

According to the first aspect of the invention, a handheld terminal, comprises when information received from an external terminal conforms to a predetermined conversation form, and identification information that represents the other-end party who is the sender of the received information has already been registered in a telephone directory and an image has also been registered in association with such other-end party, displaying the image on the display screen dedicated to the conversation form.

In the preferred construction, the handheld terminal, comprising a conversation form discriminating part which discriminates whether or not the form of the information, received by a receiving part to receive information sent from an external terminal, conforms to the predetermined conversation form.

In another preferred construction, the handheld terminal, comprising a conversation form discriminating part which discriminates whether or not the form of the information, received by a receiving part to receive information sent from an external terminal, conforms to the predetermined conversation form, and an identification information extracting part which extracts the identification information, received by the receiving part, that represents the other-end party who is the sender of the information.

In another preferred construction, the handheld terminal, comprising a telephone directory data collating part which, when the received information has been determined that it conforms to the predetermined conversation form, collates the identification information with the telephone directory data registered in the telephone directory that was set up within the storing part, and a control part which, when the condition that the data corresponding to such identification information has been registered in the telephone directory and the condition that an image related to the other-end party has been registered have both been found to be satisfied as a result of such collation by the telephone directory data collating part, displays such registered image on the display screen dedicated to the conversation form.

In another preferred construction, the handheld terminal, comprising a conversation form discriminating part which discriminates whether or not the form of the received information conforms to the predetermined conversation form, an identification information extracting part which extracts the identification information that represents the other-end party who is the sender of the information received by the receiving part, a telephone directory data collating part which, when the conversation form discriminating part determines that the received information conforms to the one predetermined conversation form, collates the identification information extracted by the identification information extracting part with the telephone directory data registered in the telephone directory that was set up within its own storing part, and a control part which, when the condition that the data corresponding to such identification information has been registered in the telephone directory and the condition that an image related to the other-end party has been registered have both been found to be satisfied as a result of such collation by the telephone directory data collating part, displays such registered image on the display screen dedicated to the conversation form.

In another preferred construction, the predetermined conversation form is a conversation form supported by the chat function.

In another preferred construction, the control part further comprises a function to store the received information in an inbox for information not conforming to the predetermined conversation form, when the conversation form discriminating part determines that the received information does not conform to the conversation form.

In another preferred construction, the control part further comprises a function to display the predetermined alternative image, which has already been provided in the storing part, on the display screen dedicated to the predetermined conversation form, when the conversation discriminating part determines that the received information conforms to the conversation form and the telephone directory data collating part determines that the identification information does not match with any item of the telephone directory data registered in its own telephone directory.

In another preferred construction, the control part further comprises a function to display the predetermined alternative image, which has already been provided in the storing part, on the display screen dedicated to the predetermined conversation form, when the conversation discriminating part determines that the received information conforms to the conversation form and the telephone directory data collating part determines that the identification information matches with an item of the telephone directory data registered in its own telephone directory, and the matching item of the telephone directory data does not have any image registered associated therewith.

In another preferred construction, the receiving part conforms to communication on a cell phone.

According to another aspect of the invention, a display control method for handheld terminal, comprising the step of when information received from an external terminal conforms to a predetermined conversation form and identification information that represents the other-end party who is the sender of the received information has already been registered in a telephone directory and an image has also been registered in association with such other-end party, displaying the image on the display screen dedicated to the conversation form.

In the preferred construction, the display control method for handheld terminal, comprising the step of a conversation form discriminating part which discriminates whether or not the form of the information, received by a receiving part to receive information sent from an external terminal, conforms to the one predetermined conversation form.

In another preferred construction, the display control method for handheld terminal, comprising the steps of discriminating whether or not the form of the information, received by a receiving part to receive information sent from an external terminal, conforms to the one predetermined conversation form, and extracting the identification information that represents the other-end party who is the sender of the information received.

In another preferred construction, the display control method for handheld terminal, comprising the steps of when the received information has been determined that it conforms to the predetermined conversation form, collating the identification information with the telephone directory data registered in the telephone directory that was set up within the storing part, and when the condition that the data corresponding to such identification information has been registered in the telephone directory and the condition that an image related to the other-end party has been registered have both found to be satisfied as a result of such collation by the collating step, displaying such registered image on the display screen dedicated to the conversation form.

In another preferred construction, the display control method for handheld terminal, comprising the steps of discriminating whether or not the form of the information received by the receiving part conforms to the predetermined conversation form, extracting the identification information that represents the other-end party who is the sender of the information received, when the conversation form discriminating step determines that the received information conforms to the predetermined conversation form, collating the identification information extracted by the extracting step with the telephone directory data registered in the telephone directory that was set up within its own storing part, and when the condition that the data corresponding to such identification information has been registered in the telephone directory and the condition that an image related to the other-end party has been registered have both found to be satisfied as a result of such collation by the collating step, displaying such registered image on the display screen dedicated to the conversation form.

In another preferred construction, the predetermined conversation form is a conversation form supported by the chat function.

In another preferred construction, the displaying step further comprises the step of storing the received information in an inbox for information not conforming to the predetermined conversation form when the discriminating step determines that the received information does not conform to the predetermined form.

In another preferred construction, the displaying step further comprises the step of displaying the predetermined alternative image, which has already been provided in the storing part, on the display screen dedicated to the predetermined conversation form, when the discriminating step determines that the received information conforms to the conversation form, and the collating step determines that the identification information does not match with any item of the telephone directory data registered in its own telephone directory.

In another preferred construction, the displaying step further comprises the step of displaying the predetermined alternative image, which has already been provided in the storing part, on the display screen dedicated to the predetermined conversation form, when the discriminating step determines that the received information conforms to the conversation form and the collating step determines that the identification information matches with an item of the telephone directory data registered in its own telephone directory, and the matching item of the telephone directory data does not have any image registered associated therewith.

According to another aspect of the invention, a display control program which is executed on a handheld terminal to control display, comprising when information received from an external terminal conforms to a predetermined conversation form, and identification information that represents the other-end party who is the sender of the received information has already been registered in a telephone directory and an image has also been registered in association with such other-end party, displaying the image on the display screen dedicated to the conversation form.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

A handheld terminal device and a display control method therefor of the present invention will now be described in detail.

Figure 1:
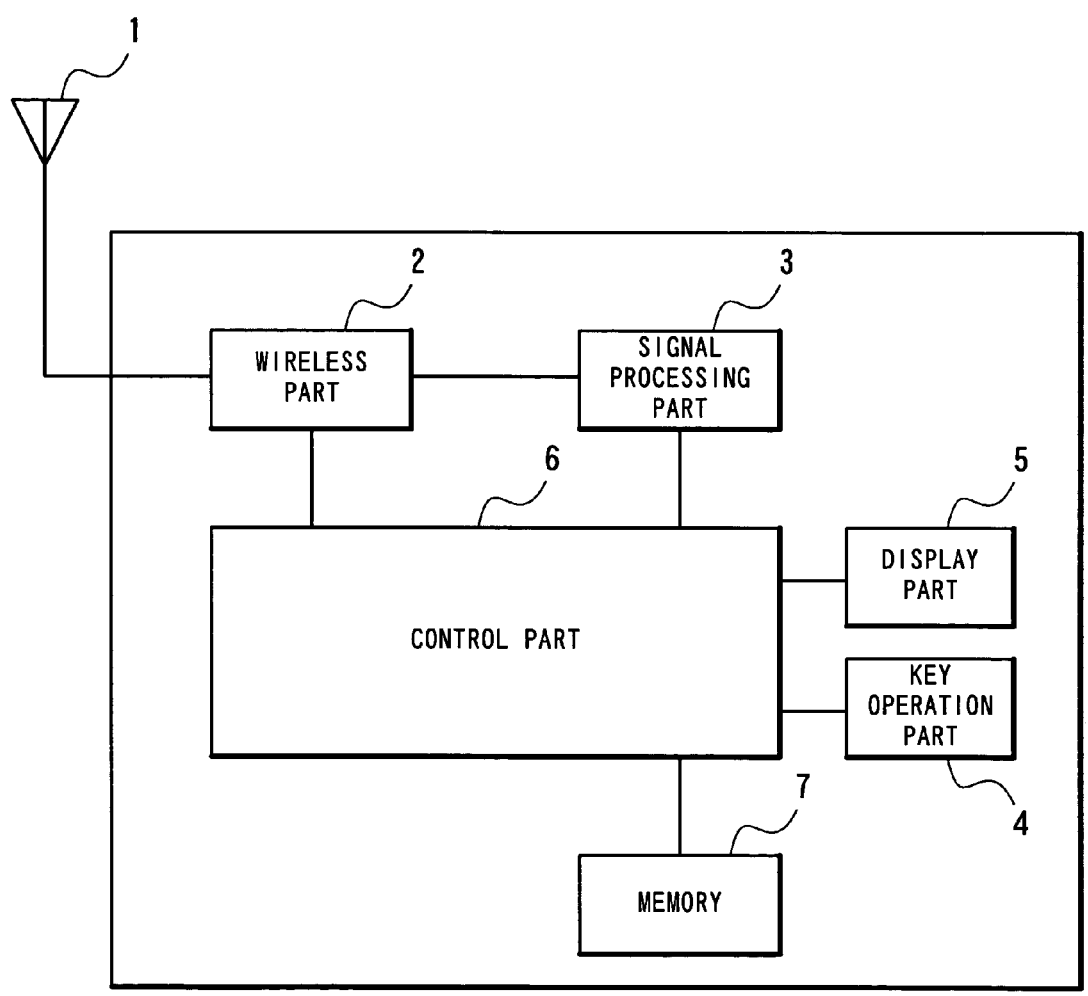
FIG. 1 is a block diagram which shows a handheld terminal device according to one embodiment of the present invention.

FIG. 1 is a block diagram which shows the configuration of a handheld terminal device according to one embodiment of the present invention. The handheld terminal device of FIG. 1 comprises an antenna 1 which transmits and receives a radio wave to and from a base station; a wireless part 2 which includes a wireless circuit for transmitting and receiving operations using the antenna 1; a signal processing part 3 which processes signals transmitted to or received by the wireless part 2; a key operation part 4 from which the user can perform various operations; a display part 5 which displays various information; a control part 6 which controls centrally the above-mentioned parts of this handheld terminal device, such as the wireless part 2, the signal processing part 3, the key operation part 4, and the display part 5; and a memory 7 which is connected with the control part 6 and which stores various data, including a telephone directory containing names, telephone numbers, email addresses, and picture images shot using a digital camera, as well as transmitted and received email messages. The antenna 1 and the wireless part 2 together serve as a receiving part to receive information sent from external information transmitting part.

Figure 2:
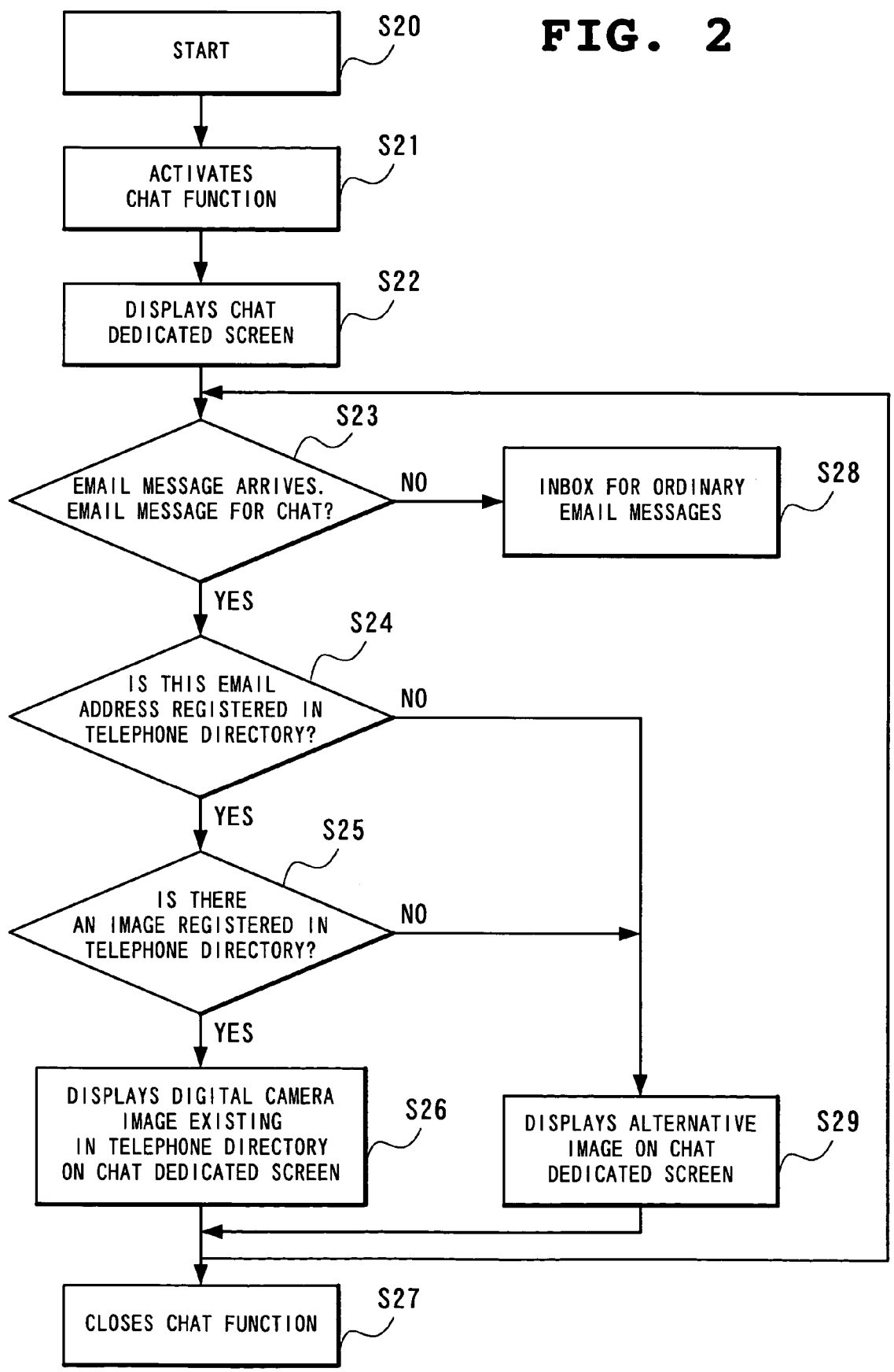
FIG. 2 is a flow chart for the chat function of the handheld terminal device of FIG. 1.

FIG. 2 is a flow chart which explains the content of the processing related to the chat function of the handheld terminal device of FIG. 1.

The operational sequence related to the chat function described below is controlled and executed by the control part 6 which is part of this handheld terminal device. In other words, the operations of the control part 6 represent those of different functional parts responsible for different processing steps in the specific operational sequence described below.

The functions realized by the control part 6 include a conversation form discriminating part (conversation form discriminating function) which discriminates whether or not the form of the information received by the above-described receiving part (antenna 1 and wireless part 2) conforms to the one predetermined conversation form (i.e., chat); an identification information extracting part (identification information extracting function) which extracts the identification information that represents the other-end party who is the sender of the information received by the receiving part (antenna 1 and wireless part 2); a telephone directory data collating part (telephone directory data collating function) which, if the received information has been discriminated by the conversation form discriminating part to conform to the one predetermined conversation form (i.e., chat), collates the identification information extracted by the identification information extracting part with the telephone directory data registered in the telephone directory set up within its own storing part; and a control part (control function) which, if the condition that the data corresponding to such identification information has been registered in the telephone directory and the condition that an image related to the other-end party has been registered in the telephone directory have both been found to be satisfied as a result of a collation by the telephone directory data collating part, displays the registered image on the display screen dedicated to the one predetermined conversation form.

When the chat function starts (Step S20), the chat function is activated (Step S21) and the chat dedicated screen display is displayed (Step S22). If an email message is received in this sate, the identification information that represents the other-end party who is the sender of the information received is extracted (identification information extracting function). It is also determined whether or not the email message received is one for chat (Step S23: conversation form discriminating function). If the message is determined to be for chat, a collation is performed to determine if the message is from an email address existing in the telephone directory (Step S24: telephone directory data collating function). If determined otherwise, the message is stored in the inbox for ordinary email messages (Step S28).

If the collation described above (Step S24) finds that the email address of the email message received does not exist in the telephone directory, then another image as an alternative to a digital camera image is displayed on the chat dedicated screen, together with the message received (Step S29: control function).

If the collation described above (Step S24) finds that the email address of the email message received does exist in the telephone directory, then the telephone directory is checked for a digital camera image associated with that address (Step S25). If it is found that there is no digital camera image associated with that address, another image as an alternative to a digital camera image is displayed on the chat dedicated screen, together with the message received (Step S29).

If it is found that there is a digital camera image associated with that address, the digital camera image registered in the telephone directory is displayed on the chat dedicated screen, together with the message received (Step S26: control function), and then the chat function is closed (Step S27).

After displaying the alternative image on the chat dedicated screen (Step S29) or displaying the digital camera image in the telephone directory (Step S26), the handheld terminal device goes into standby mode until the next email message arrives.

Figure 3:
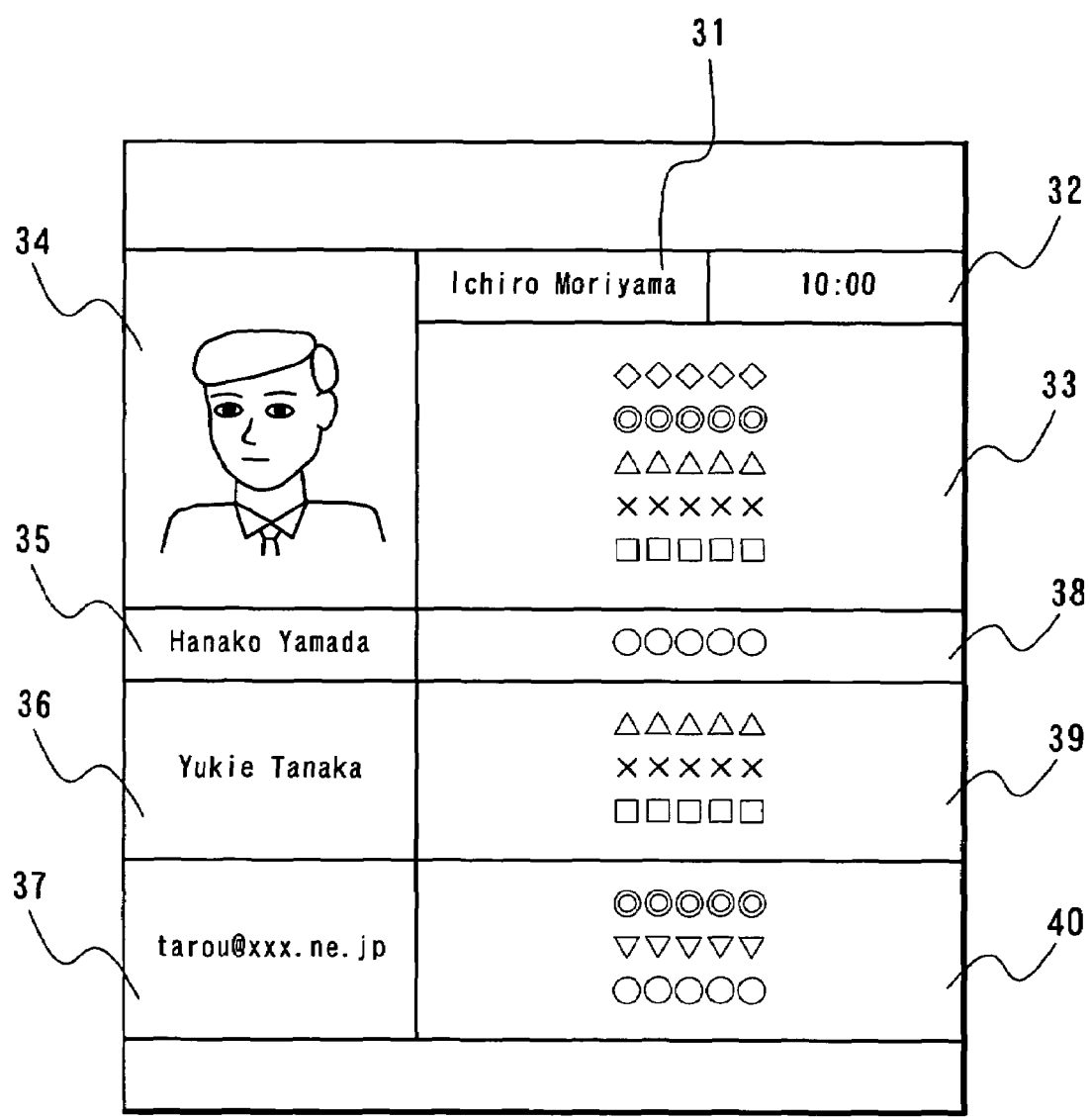
FIG. 3 is a diagram which shows an example configuration of a chat dedicated screen.

FIG. 3 is a diagram which shows an example configuration of a chat dedicated screen. As shown in FIG. 3, the chat dedicated screen is made up of a number of areas. The area indicated by code 31 displays the name of the sender of the latest message that has been registered in the telephone directory or, if not registered, the email address. The area indicated by code 32 displays the transmission time for the message. The area indicated by code 33 displays the body of the latest email message. The area indicated by code 34 displays the digital camera image or the alternative image that will be displayed as appropriate according to the result of the collation with the telephone directory for the latest sender. Furthermore, the areas indicated by codes 35 to 37 can display up to three latest senders by their names (if registered in the telephone directory) or email addresses (if not registered in the telephone directory), and the areas indicated by codes 38 to 40 can display up to three latest transmitted messages. The maximum number of latest senders and that of transmitted messages may be changed to any plural number as appropriate according to the size of the display screen. The chat dedicated screen can be laid out otherwise to display in any of the areas indicated by codes 35 to 37 the simplified names (nicknames) of the latest senders that have been registered exclusively for use by the chat function, rather than the names registered in the telephone directory.

According to the above-described embodiment, the user can be freed from the onerous operations that have conventionally been required in displaying the image of the other-end party on the chat dedicated screen, such as registering email addresses and images corresponding to these email addresses one more time for use by the chat function. Moreover, for all the data in the telephone directory, this embodiment can utilize the images registered in the telephone directory, thereby eliminating the constraint that it may run out of the area for registration of images for exclusive use by the chat function. In addition, this embodiment can reduce the memory storage area that must be implemented in a cell phone because there is no need to store images exclusively for use on the chat dedicated screen.

While in the foregoing an example of using digital camera images as data to be stored in a telephone directory has been described, it is also possible to configure the handheld terminal device in such a way that the background of the latest message is displayed in the registered color if it allows color information to be registered additionally for each item of the telephone directory data.

In addition to realizing the various component functions as hardware parts, the handheld terminal device of the present invention can accomplish these functions by executing the above-described functions as software through a display control program (application), which is loaded in the memory of the computer processing part (CPU) realizing the handheld terminal device and which can be executed to display an image on a message display screen dedicated to communication in a specific conversation form. To realize the above-described functions, this display control program is stored in a magnetic disc, semiconductor memory, or other storage medium, is loaded from such storage medium onto a computer processing part of the handheld terminal device, and is executed to control such computer processing part.

According to the present invention described in the foregoing, it is possible to realize a handheld terminal device and a display control method therefor which allow a digital camera image to be used for display on a message display screen dedicated to a specific conversation form like chat if such image has been registered in association with an other-end party registered in a telephone directory.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A handheld terminal device, comprising:
a display part which is configured to, when information received from an external terminal conforms to a predetermined conversation form, and identification information that represents the other-end party who is the sender of the received information has already been registered in a telephone directory and an image has also been registered in association with such other-end party, display said image on the display screen dedicated to the predetermined conversation form,
wherein said predetermined conversation form is a conversation form supported by a chat function,
wherein the display part is configured to:
display a plurality of chat messages in order of receipt, in which a most recent one of the plurality of chat messages is displayed along with the corresponding image of the other-end party that sent the most recent one of the chat messages,
wherein all other ones of the plurality of chat messages that are displayed together with the most recent one of the plurality of chat messages are displayed without their corresponding images.

2. The handheld terminal device as set forth in claim 1, further comprising:
a conversation form discriminating part which discriminates whether or not the form of the information, received by a receiving part to receive information sent from the external terminal, conforms to the predetermined conversation form.

3. The handheld terminal device as set forth in claim 1, further comprising:
a conversation form discriminating part which discriminates whether or not the form of the information, received by a receiving part to receive information sent from the external terminal, conforms to the predetermined conversation form, and
an identification information extracting part which extracts the identification information, received by said receiving part, that represents the other-end party who is the sender of the information.

4. The handheld terminal device as set forth in claim 1, further comprising:
a telephone directory data collating part which, when the received information has been determined that it conforms to the predetermined conversation form, collates said identification information with the telephone directory data registered in the telephone directory that was set up within the storing part, and
a control part which, when the condition that the data corresponding to such identification information has been registered in the telephone directory and the condition that an image related to the other-end party has been registered have both been found to be satisfied as a result of such collation by the telephone directory data collating part, displays such registered image on the display screen dedicated to the conversation form.

5. The handheld terminal device as set forth in claim 1, further comprising:
a conversation form discriminating part which discriminates whether or not the form of the received information conforms to the predetermined conversation form
an identification information extracting part which extracts the identification information that represents the other-end party who is the sender of the information received by said receiving part,
a telephone directory data collating part which, when said conversation form discriminating part determines that the received information conforms to the one predetermined conversation form, collates said identification information extracted by said identification information extracting part with the telephone directory data registered in the telephone directory that was set up within its own storing part, and
a control part which, when the condition that the data corresponding to such identification information has been registered in the telephone directory and the condition that an image related to the other-end party has been registered have both been found to be satisfied as a result of such collation by the telephone directory data collating part, displays such registered image on the display screen dedicated to said conversation form.

6. The handheld terminal device as set forth in claim 5, wherein
said control part further comprises a function to store the received information in an inbox for information not conforming to the predetermined conversation form, when said conversation form discriminating part determines that the received information does not conform to said predetermined conversation form.

7. The handheld terminal device as set forth in claim 5, wherein
said control part further comprises a function to display a predetermined alternative digital camera image, which has already been provided in said storing part, on the display screen dedicated to the predetermined conversation form, when said conversation discriminating part determines that the received information conforms to said predetermined conversation form and said telephone directory data collating part determines that said identification information does not match with any item of the telephone directory data registered in its own telephone directory.

8. The handheld terminal device as set forth in claim 5, wherein
said control part further comprises a function to display a predetermined alternative digital camera image, which has already been provided in said storing part, on the display screen dedicated to the predetermined conversation form, when said conversation discriminating part determines that the received information conforms to said predetermined conversation form and said telephone directory data collating part determines that said identification information matches with an item of the telephone directory data registered in its own telephone directory, and said matching item of the telephone directory data does not have any image registered associated therewith.

9. The handheld terminal device as set forth in claim 2, wherein said receiving part conforms to communication on a cell phone.

10. A display control method for handheld terminal, comprising the step of:
when information received from the external terminal conforms to the predetermined conversation form and identification information that represents the other-end party who is the sender of the received information has already been registered in a telephone directory and an image has also been registered in association with such other-end party, displaying said image on the display screen dedicated to said conversation form,
wherein said predetermined conversation form is a conversation form supported by a chat function,
wherein the display part is configured to:
display a plurality of chat messages in order of receipt, in which a most recent one of the plurality of chat messages is displayed along with the corresponding image of the other-end party that sent the most recent one of the chat messages,
wherein all other ones of the plurality of chat messages that are displayed together with the most recent one of the plurality of chat messages are displayed without their corresponding image.

11. The display control method for handheld terminal device as set forth in claim 10, further comprising the step of:
- a conversation form discriminating part which discriminates whether or not the form of the information, received by a receiving part to receive information sent from an external terminal, conforms to the predetermined conversation form.

12. The display control method for handheld terminal device as set forth in claim 10, further comprising the steps of:
- discriminating whether or not the form of the information, received by a receiving part to receive information sent from an external terminal, conforms to the one predetermined conversation form, and
- extracting the identification information that represents the other-end party who is the sender of the information received.

13. The display control method for handheld terminal device as set forth in claim 10, further comprising the steps of:
- when the received information has been determined that it conforms to the predetermined conversation form, collating said identification information with the telephone directory data registered in the telephone directory that was set up within the storing part, and
- when the condition that the data corresponding to such identification information has been registered in the telephone directory and the condition that an image related to the other-end party has been registered have both found to be satisfied as a result of such collation by said collating step, displaying such registered image on the display screen dedicated to the conversation form.

14. The display control method for handheld terminal device as set forth in claim 10, further comprising the steps of:
- discriminating whether or not the form of the information received by said receiving part conforms to the predetermined conversation form,
- extracting the identification information that represents the other-end party who is the sender of the information received,
- when said conversation form discriminating step determines that the received information conforms to the predetermined conversation form, collating said identification information extracted by said extracting step with the telephone directory data registered in the telephone directory that was set up within its own storing part, and
- when the condition that the data corresponding to such identification information has been registered in the telephone directory and the condition that an image related to the other-end party has been registered have both found to be satisfied as a result of such collation by said collating step, displaying such registered image on the display screen dedicated to said conversation form.

15. The display control method for handheld terminal device as set forth in claim 14, wherein
said displaying step further comprises the step of storing the received information in an inbox for information not conforming to the predetermined conversation form when said discriminating step determines that the received information does not conform to the predetermined conversation form.

16. The display control method for handheld terminal device as set forth in claim 14, wherein
said displaying step further comprises the step of displaying a predetermined alternative digital camera image, which has already been provided in said storing part, on the display screen dedicated to the predetermined conversation form, when said discriminating step determines that the received information conforms to said predetermined conversation form, and said collating step determines that said identification information does not match with any item of the telephone directory data registered in its own telephone directory.

17. The display control method for handheld terminal device as set forth in claim 14, wherein
said displaying step further comprises the step of displaying a predetermined alternative digital camera image, which has already been provided in said storing part, on the display screen dedicated to the predetermined conversation form, when said discriminating step determines that the received information conforms to said predetermined conversation form and said collating step determines that said identification information matches with an item of the telephone directory data registered in its own telephone directory, and said matching item of the telephone directory data does not have any image registered associated therewith.

18. A computer readable media, encoded with a display control program, which is executed on a handheld terminal device to control display, the program causing a processor of the handheld terminal device to perform the steps of:
- determining whether information received from an external terminal conforms to a predetermined conversation form,
- determining whether identification information that represents the other-end party who is the sender of the received information has already been registered in a telephone directory and an image has also been registered in association with the other end party, and
- if the two determining steps have determined that the information received from the external terminal conforms to the predetermined conversation form and the identification information has already been registered in the telephone directory and the image has also been registered, displaying said image on the display screen dedicated to said conversation form,
- wherein said predetermined conversation form is a conversation form supported by a chat function,
- wherein the display part is configured to:
- display a plurality of chat messages in order of receipt, in which a most recent one of the plurality of chat messages is displayed along with the corresponding image of the other-end party that sent the most recent one of the chat messages,
- wherein all other ones of the plurality of chat messages that are displayed together with the most recent one of the plurality of chat messages are displayed without their corresponding image.

19. The display control program as set forth in claim 18, further causing the processor to perform the steps of:
- discriminating whether or not the form of the information received by a receiving part to receive information sent from an external terminal conforms to the one predetermined conversation form.

20. The display control program as set forth in claim 18, further causing the processor to perform the steps of:
- discriminating whether or not the form of the information, received by a receiving part to receive information sent from an external terminal, conforms to the one predetermined conversation form, and extracting the identification information that represents the other-end party who is the sender of the information received.

21. The display control program as set forth in claim 18, further causing the processor to perform the steps of:

when the received information has been determined that it conforms to the predetermined conversation form, collating said identification information with the telephone directory data registered in the telephone directory that was set up within the storing part, and when the condition that the data corresponding to such identification information has been registered in the telephone directory and the condition that an image related to the other-end party has been registered have both been found to be satisfied as a result of such collation by said collating function, displaying such registered image on the display screen dedicated to the conversation form.

22. The display control program as set forth in claim 18, further causing the processor to perform the steps of:

discriminating whether or not the form of the information received by said receiving part conforms to the predetermined conversation form, extracting the identification information that represents the other-end party who is the sender of the information received, when said conversation form discriminating function determines that the received information conforms to the predetermined conversation form, collating said identification information extracted by said extracting function with the telephone directory data registered in the telephone directory that was set up within its own storing part, and when the condition that the data corresponding to such identification information has been registered in the telephone directory and the condition that an image related to the other-end party has been registered have both been found to be satisfied as a result of such collation by said collating function, displaying such registered image on the display screen dedicated to the conversation form.

* * * * *